United States Patent
Jeong et al.

(10) Patent No.: US 9,643,209 B2
(45) Date of Patent: *May 9, 2017

(54) METHOD OF MANUFACTURING REVERSE OSMOSIS MEMBRANE, AND REVERSE OSMOSIS MEMBRANE MANUFACTURED THEREBY

(71) Applicant: LG CHEM, LTD., Seoul (KR)

(72) Inventors: Seung-Pyo Jeong, Daejeon (KR); Seung-Yup Lee, Daejeon (KR); Phill Lee, Daejeon (KR); Hye-Jin Kwon, Daejeon (KR); Chong-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,825

(22) Filed: Dec. 30, 2014

(65) Prior Publication Data

US 2015/0114902 A1  Apr. 30, 2015

Related U.S. Application Data

(63) Continuation of application No. 14/026,783, filed on Sep. 13, 2013, now Pat. No. 8,993,053, which is a
(Continued)

(30) Foreign Application Priority Data

May 24, 2012 (KR) .................. 10-2012-0055592
May 24, 2013 (KR) .................. 10-2013-0059348

(51) Int. Cl.
  *B01D 71/56* (2006.01)
  *B29C 65/00* (2006.01)
(Continued)

(52) U.S. Cl.
  CPC ............ *B05D 5/00* (2013.01); *B01D 61/025* (2013.01); *B01D 69/10* (2013.01); *B01D 69/125* (2013.01);
(Continued)

(58) Field of Classification Search
  CPC  B01D 71/68; B01D 67/0011; B01D 67/0016; B01D 69/06; B01D 69/12;
(Continued)

(56) References Cited

U.S. PATENT DOCUMENTS 4,157,950 A * 6/1979 Frilette et al. ................. 208/135
4,774,039 A * 9/1988 Wrasidlo ......................... 264/41
(Continued)

FOREIGN PATENT DOCUMENTS

CN      1310638 A    8/2001
JP    07-008770 A    1/1995
(Continued)

OTHER PUBLICATIONS

Allan F.M. Barton., "Hansen Parameters for Solvents at 25° C.", Handbook of Solubility Parameters, 1983, pp. 153-157, CRC Press.
(Continued)

*Primary Examiner* — Ana Fortuna

(57) ABSTRACT

There are provided a method of manufacturing a reverse osmosis membrane and a reverse osmosis membrane manufactured thereby. The method includes forming a polysulfone layer by applying a solution including a mixed solvent containing two or more solvents having different solubility parameter values to a surface of a porous support; and forming an active layer on the polysulfone layer.

2 Claims, 3 Drawing Sheets

Related U.S. Application Data continuation of application No. PCT/KR2013/004582, filed on May 24, 2013.

(51) Int. Cl.

| | | |
|---|---|---|
| *B01D 29/46* | (2006.01) | |
| *B05D 5/00* | (2006.01) | |
| *B01D 61/02* | (2006.01) | |
| *B01D 69/10* | (2006.01) | |
| *B01D 69/12* | (2006.01) | |
| *B01D 71/68* | (2006.01) | |

(52) U.S. Cl.
CPC ............ *B01D 71/56* (2013.01); *B01D 71/68* (2013.01); *B01D 2325/02* (2013.01); *B05D 2350/00* (2013.01)

(58) Field of Classification Search
CPC ................ B01D 71/56; B01D 67/0009; B29K 2105/04; B29K 2081/06
USPC ........ 210/500.38, 500.41, 490; 427/244, 245
See application file for complete search history.

(56) References Cited

U.S. PATENT DOCUMENTS

| | | | | |
|---|---|---|---|---|
| 4,970,034 | A * | 11/1990 | Ly et al. ...................... | 264/46.4 |
| 4,983,291 | A * | 1/1991 | Chau et al. ................... | 210/490 |
| 5,576,057 | A | 11/1996 | Hirose et al. | |
| 5,851,394 | A * | 12/1998 | Shibata et al. ............ | 210/500.23 |
| 6,071,406 | A * | 6/2000 | Tsou ........................ | 210/500.41 |
| 6,540,914 | B1 * | 4/2003 | Smith .......................... | 210/297 |
| 8,580,341 | B2 * | 11/2013 | Wang et al. ................... | 427/244 |
| 8,646,617 | B2 * | 2/2014 | Jeong et al. ............. | 210/500.38 |
| 8,993,053 | B2 * | 3/2015 | Jeong et al. ................... | 427/244 |
| 9,156,006 | B2 * | 10/2015 | Yip ..................... | B01D 61/002 |
| 2003/0038074 | A1 | 2/2003 | Patil et al. | |
| 2004/0213985 | A1 | 10/2004 | Lee et al. | |
| 2008/0197072 | A1 * | 8/2008 | Ansorge et al. ......... | 210/500.41 |
| 2011/0155659 | A1 | 6/2011 | Yoon et al. | |
| 2014/0014575 | A1 * | 1/2014 | Kwon et al. ............. | 210/500.33 |
| 2015/0014244 | A1 * | 1/2015 | Shimura et al. ......... | 210/500.27 |

FOREIGN PATENT DOCUMENTS

| | | |
|---|---|---|
| JP | 2000-153137 A | 6/2000 |
| KR | 10-2000-0015371 A | 3/2000 |
| KR | 10-2002-0001035 A | 1/2002 |
| KR | 10-2010-0022928 A | 3/2010 |
| KR | 10-2010-0049189 A | 5/2010 |
| KR | 10-2011-0079142 A | 7/2011 |
| WO | WO 2011/069050 A1 | 6/2011 |

OTHER PUBLICATIONS

In-Chul Kim et al., "Effect of Various Additives on Pore Size of Polysulfone Membrane by Phase-Inversion Process", Journal of Applied Polymer Science, 2003, pp. 2562-2566, vol. 89, Wiley Periodicals, Inc.

Alberto Tiraferri, et al., "Relating performance of thin-film composite forward osmosis membranes to support layer formation and structure", Journal of Membrane Science, 2011, pp. 340-352, vol. 367, Elsevier B.V.

Asim K. Ghosh, et al., "Impacts of support membrane structure and chemistry on polyamide-polysulfone interfacial composite membranes", Journal of Membrane Science, Mar. 28, 2009, pp. 140-148, vol. 336, Elsevier B.V.

Puyam S. Singh, et al., "Probing the structural variations of thin film composite RO membranes obtained by coating polyamide over polysulfone membranes of different pore dimensions", Journal of Membrane Science, 2006, pp. 19-25, vol. 278, Elsevier B.V.

Ying Dai, et al., "Thin film composite (TFC) membranes with improved thermal stability from sulfonated poly(phthalazinone ether sulfone ketone) (SPPESK)", Journal of Membrane Science, Apr. 24, 2002, pp. 189-197, vol. 207, Elsevier B.V.

Extended European Search Report for European Patent Application No. EP 13794710.7 dated Jan. 19, 2016.

Japanese Office Action for Application No. 2014-516934, dated Aug. 3, 2015.

* cited by examiner

METHOD OF MANUFACTURING REVERSE OSMOSIS MEMBRANE, AND REVERSE OSMOSIS MEMBRANE MANUFACTURED THEREBY

CROSS-REFERENCE TO RELATED APPLICATIONS

This application is a Continuation application of U.S. patent application Ser. No. 14/026,783, filed Sep. 13, 2013, which is a Bypass Continuation application of International Patent Application No. PCT/KR2013/004582, filed May 24, 2013, and claims the benefit of Korean Patent Application Nos. 10-2012-0055592 filed on May 24, 2012, and 10-2013-0059348 filed on May 24, 2013, in the Korean Intellectual Property Office, the disclosure of which are incorporated herein by reference.

TECHNICAL FIELD

The present disclosure relates to a method of manufacturing a reverse osmosis membrane and a reverse osmosis membrane manufactured thereby, and more particularly, to a method of manufacturing a reverse osmosis membrane by adjusting the pore diameter distribution, density, pore area ratio, and the like, of pores formed in a polysulfone layer using a mixed solvent containing two or more solvents having different solubility parameter values at the time of forming the polysulfone layer on a porous support, to thereby increase permeation flux, while having superior salt rejection, antifouling properties and durability, as compared to existing reverse osmosis membranes, and a reverse osmosis membrane manufactured thereby.

BACKGROUND

Osmosis is a phenomenon in which a solvent moves from a solution having a low solute concentration to another solution having a high solute concentration by passing through a semi-permeable separation membrane isolating the two solutions. In this case, pressure acting on the solution having a high solute concentration through the movement of the solvent is known as osmotic pressure. However, when external pressure having a level greater than that of osmotic pressure is applied, the solvent moves towards the solution having a low solute concentration, and such a phenomenon is known as reverse osmosis. Various types of salt or organic material may be separated by a semi-permeable membrane using a pressure gradient as driving force, according to the reverse osmosis principle. A reverse osmosis membrane using a reverse osmosis phenomenon has been used to separate molecular-level materials, remove salts from salt water or sea water and supply water available for domestic, commercial and industrial use.

The reverse osmosis membrane may representatively include a polyamide-based reverse osmosis membrane, by way of example. The polyamide-based reverse osmosis membrane may be manufactured by forming a polyamide active layer on a microporous support. More particularly, the polyamide-based reverse osmosis membrane may be manufactured by preparing a microporous support by forming a polysulfone layer on a non-woven fabric, dipping the microporous support into an aqueous m-phenylenediamine (mPD) solution to form an mPD layer, dipping the mPD layer into an organic solvent containing trimesoyl chloride (TMC) to allow the mPD layer to be brought into contact with the TMC so as to be interfacially polymerized to thereby form a polyamide layer.

However, the polyamide-based reverse osmosis membrane manufactured by the above conventional method may suffer from low initial permeation flux efficiency, resulting in deterioration of a water purifying function. Furthermore, in the case of water treatment using a reverse osmosis membrane, a solute or an ionic compound may be adsorbed to the surface of the reverse osmosis membrane to pollute the reverse osmosis membrane, and thus, water permeability characteristics such as permeation flux and salt rejection have been degraded over time.

Therefore, research into development of a reverse osmosis membrane having superior durability as well as improvements in water permeability characteristics such as permeation flux and salt rejection is urgently in demand.

SUMMARY

An aspect of the present disclosure provides a method of manufacturing a reverse osmosis membrane able to achieve superior antifouling properties and durability and to increase permeation flux while improving salt rejection, and a reverse osmosis membrane manufactured thereby.

According to an aspect of the present disclosure, there is provided a method of manufacturing a reverse osmosis membrane, the method including: forming a polysulfone layer by applying a solution including a mixed solvent containing two or more solvents having different solubility parameter values to a surface of a porous support; and forming an active layer on polysulfone layer.

According to another aspect of the present disclosure, there is provided a reverse osmosis membrane manufactured by the method as described above.

BRIEF DESCRIPTION OF THE DRAWINGS

The above and other aspects, features and other advantages of the present inventive concept will be more clearly understood from the following detailed description taken in conjunction with the accompanying drawings, in which.

DETAILED DESCRIPTION OF THE EMBODIMENTS

Figure 1:
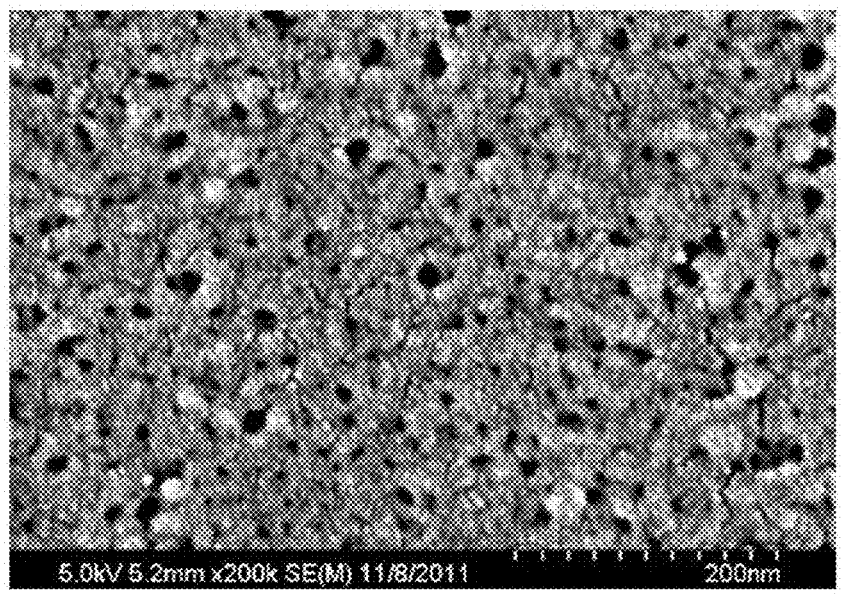
FIG. 1 is a scanning electron microscope (SEM) image showing a surface of a polysulfone layer of a reverse osmosis membrane manufactured according to Inventive Example 2.

Embodiments of the present inventive concept will now be described in detail with reference to the accompanying drawings.

The inventive concept may, however, be exemplified in many different forms and should not be construed as being limited to the specific embodiments set forth herein. Rather, these embodiments are provided so that this disclosure will be thorough and complete, and will fully convey the scope of the inventive concept to those skilled in the art.

Throughout the present specification, solubility parameters refer to 'Hansen Solubility Parameters' and solubility parameter values of respective solvents are obtained from Hansen's 1971 parameters listed in the *Handbook of Solubility Parameters*, Allan F. M. Barton. Ph.D., CRC Press, 1983, page 153-157.

In addition, a pore diameter refers to a value obtained by measuring the longest distance across a pore formed in a surface of a polysulfone layer in a case in which the pore has a circular or oval shape.

Furthermore, a numerical value related to the distribution of pores having a diameter of 40 nm or greater is obtained by performing a measurement by selecting a 10 cm×10 square region based on any point on the surface of the polysulfone layer.

The inventors of the invention have conducted repeated experimentation in order to develop a reverse osmosis membrane able to improve permeation flux while having superior salt rejection, and have found that when a reverse osmosis membrane is manufactured using a mixed solvent containing two or more solvents having different solubility parameter values at the time of forming a polysulfone layer, the performance of the reverse osmosis membrane may be improved, as compared with existing reverse osmosis membranes, by adjusting the diameters and density of pores formed in the polysulfone layer using a change in the outflow rates of the solvents at the time of forming the membrane.

In the case of forming a polysulfone layer at the time of manufacturing a reverse osmosis membrane according to the related art, N,N-dimethylformamide (DMF) has generally been used as a solvent. In this case, pores formed in the surface of the polysulfone layer have excessively large diameters, and thus, an active layer formed on the polysulfone layer has not been stably formed. However, a reverse osmosis membrane according to an embodiment of the invention may have a uniform active layer by increasing the number of micro pores formed in the polysulfone layer, and thus, the reverse osmosis membrane may be manufactured to have superior antifouling properties and durability and significantly improve the performance thereof such as salt rejection, initial permeation flux and the like.

A method of manufacturing a reverse osmosis membrane according to an embodiment of the invention includes (1) forming a polysulfone layer by applying a mixed solvent containing two or more solvents having different solubility parameter values to a surface of a porous support; and (2) forming an active layer on the polysulfone layer.

Here, a general porous support known in the art may be used without limitation. For example, the porous support may be a non-woven fabric. Materials for the non-woven fabric may include polyester, polycarbonate, finely porous polypropylene, polyphenylene ether, poly vinylindene fluoride and the like, but are not limited thereto.

In addition, the forming of the polysulfone layer may be performed using a solution including a polymer having a sulfonic acid group and a mixed solvent containing two or more solvents having different solubility parameter values.

For example, the polymer having a sulfonic acid group may be selected from the group consisting of polysulfone, polyethersulfone, polyarylsulfone, poly alkyl sulfone, poly aralkyl sulfone, polyphenyl sulfone, and poly ether ether sulfone, but is not limited thereto.

In addition, an amount of the polymer having a sulfonic acid group may be 5 to 45 parts by weight, 7 to 40 parts by weight or 10 to 30 parts by weight, based on 100 parts by weight of the solution. In a case in which the amount of the polymer having a sulfonic acid group satisfies the above ranges, the polymer may be easily dissolved in the mixed solvent, whereby the forming of the polysulfone layer may be facilitated.

Meanwhile, an amount of the mixed solvent containing two or more solvents having different solubility parameter values may be 55 to 95 parts by weight, 60 to 93 parts by weight or 66 to 90 parts by weight, based on 100 parts by weight of the solution. In a case in which the amount of the mixed solvent containing two or more solvents having different solubility parameter values satisfies the above ranges, when they are coated on the surface of the porous support in order to form the polysulfone layer, a thickness of the coating layer may be easily adjusted, and thus, the relevant process may be effectively simplified.

In the method of manufacturing a reverse osmosis membrane according to the embodiment of the invention, a difference in the solubility parameter values of two or more solvents included in the mixed solvent for use in the forming of the polysulfone layer may be 0.1 to 15, 0.1 to 10, 0.2 to 8.5, 0.1 to 5, or 0.1 to 3. In a case in which the difference in the solubility parameter values satisfies the above ranges, the outflow rates of the solvents from the solution including the polymer having a sulfonic acid group and the mixed solvent containing two or more solvents having different solubility parameter values may be easily adjusted to thereby control the diameters of the pores formed in the surface of the polysulfone layer within a desired range.

Meanwhile, the mixed solvent containing two or more solvents having different solubility parameter values are not particularly limited so long as a difference in the solubility parameter values of respective solvents is within a range of 0.1 to 15. For example, the mixed solvent may include two or more solvents selected from the group consisting of dimethylacetamide, methyl acetate, hydrazine, trichloromethane, diiodomethane, trichloroethylene, styrene, 2-butanone, tetrahydrofuran, cyclohexanone, acetone, benzonitrile, isophorone, 2-ethyl-1-hexanol, dichloromethane, dibutyl phthalate, 1,4-Dioxane, 1,2-dichlorobenzene, 1,2-dichloroethane, 2-butoxyethanol, 1-bromonaphthalene, acetic acid, epichlorohydrin, benzaldehyde, morpholine, acrylonitrile, acetophenone, pyridine, 2-butanol, cyclohexanol, aniline, 2-methylpropyl alcohol, 3-methylphenol, N-methyl-2-pyrrolidine, 1-butanol, bromine, 2-ethoxyethanol, phenoxyethanol, 2-propanol, benzyl alcohol, dimethylethanolamine, 2-furanmethanol, acetonitrile, 1-propanol, 2-methoxymethanol, methanoic acid, N,N-dimethylformamide, nitromethane, ethanol, dimethyl sulfoxide, propylene carbonate, 1,3-butanediol, diethylene glycol, methanol, 1,2-propanediol, 2-aminoethanol, ethylene glycol, ethylene carbonate, diethyl sulfate, nitroethane, allyl alcohol and γ-butyrolactone.

More specifically, in the method of manufacturing a reverse osmosis membrane according to the embodiment of the invention, the mixed solvent used in the forming of the polysulfone layer may be, for example, a mixture of ① a first solvent having a solubility parameter value of 21 $(J/cm^3)^{1/2}$ to 30 $(J/cm^3)^{1/2}$ and ② a second solvent having a solubility parameter value different from that of the first solvent by 0.1 to 15. In a case in which the first solvent satisfies the above solubility parameter range, it may allow the polymer having a sulfonic acid group to be easily dissolved therein, thereby being effective in the formation of the polysulfone layer. In addition, in a case in which the first solvent is mixed with the second solvent having a solubility parameter difference of 0.1 to 15 with respect to the solubility parameter value of the first solvent, when the polysulfone layer is formed on the porous support, the outflow rates of the solvents may be appropriately adjusted to thereby control the diameters of the pores formed in the surface of the polysulfone layer within a desired range. That is, the pore diameter distribution, density, pore area ratio, and the like, of the pores may be easily adjusted within desired ranges by appropriately using the difference in the solubility parameter values.

Meanwhile, the first solvent having a solubility parameter value of 21 $(J/cm^3)^{1/2}$ to 30 $(J/cm^3)^{1/2}$ may be selected from the group consisting of acetic acid, epichlorohydrin, benzaldehyde, morpholine, acrylonitrile, acetophenone, pyridine, 2-butanol, cyclohexanol, aniline, 2-methylpropyl alcohol, 3-Methylphenol, N-methyl-2-pyrrolidine, 1-butanol, bromine, 2-ethoxyethanol, phenoxyethanol, 2-propanol, benzyl alcohol, dimethylethanolamine, 2-furanmethanol, acetonitrile, 1-propanol, 2-methoxymethanol, methanoic acid, N,N-dimethylformamide, nitromethane, ethanol, dimethyl sulfoxide, propylene carbonate, 1,3-butanediol, diethylene glycol, methanol, ethylene carbonate, diethyl sulfate, nitroethane, allyl alcohol and γ-butyrolactone, but is not limited thereto.

In addition, the second solvent having a solubility parameter difference of 0.1 to 15 with respect to the solubility parameter value of the first solvent may be selected from the group consisting of 2-butanol, cyclohexanol, aniline, 2-methylpropyl alcohol, 3-methylphenol, N-methyl-2-pyrrolidine, 1-butanol, bromine, 2-ethoxyethanol, phenoxyethanol, 2-propanol, benzyl alcohol, dimethylethanolamine, 2-furanmethanol, acetonitrile, 1-propanol, 2-methoxymethanol, methanoic acid, N,N-Dimethylformamide, nitromethane, ethanol, dimethyl sulfoxide, propylene carbonate, 1,3-butanediol, diethylene glycol, methanol, ethylene carbonate, diethyl sulfate, nitroethane, allyl alcohol and γ-butyrolactone, but is not limited thereto.

More specifically, the mixed solvent may be, for example, a mixture of N,N-dimethyl formamide (DMF) and dimethyl sulfoxide (DMSO) or a mixture of N,N-dimethylformamide (DMF) and γ-butyrolactone (GBL).

Here, N,N-dimethylformamide (DMF) has a slight solubility parameter difference from the solubility parameter value of polysulfone, that is, it has superior affinity with the polysulfone polymer, and thus, it may cause the polysulfone polymer to be more easily dissolved therein, thereby effectively facilitating the forming of the polysulfone layer. In addition, dimethyl sulfoxide (DMSO) or γ-butyrolactone (GBL) mixed with N,N-dimethylformamide (DMF) has a relatively large difference from the solubility parameter value of polysulfone, that is, it has low affinity with the polysulfone polymer, and thus, it may be rapidly discharged during the forming the polysulfone layer. By adjusting the outflow rates of the solvents, the number of micro pores formed in the surface of the polysulfone layer may be increased.

Meanwhile, in the method of manufacturing a reverse osmosis membrane according to the embodiment of the invention, a ratio of the solvents included in the mixed solvent for use in the forming of the polysulfone layer, for example, a ratio of the first solvent having a solubility parameter value of 21 $(J/cm^3)^{1/2}$ to 30 $(J/cm^3)^{1/2}$ and the second solvent having a solubility parameter value different from that of the first solvent by 0.1 to 15, may be 95:5 to 50:50, 90:10 to 55:45, or 85:15 to 60:40. In a case in which the mixture ratio satisfies the above range, the number of pores having a diameter of 40 nm or greater may be adjusted to be less than 0.5% of the total number of pores formed in the surface of the polysulfone layer, resulting in allowing for a polyamide layer to be uniformly formed on the polysulfone-based support layer. In this manner, the performance of the active layer, i.e., the polyamide layer may be improved, whereby the reverse osmosis membrane including such a polyamide layer may be significantly improved in terms of salt rejection and initial permeation flux.

More specifically, a ratio of N,N-dimethylformamide (DMF) and dimethyl sulfoxide (DMSO) included in the mixed solvent may be 90:10 to 60:40 or 80:20 to 70:30. Alternatively, a ratio of N,N-dimethylformamide (DMF) and γ-butyrolactone (GBL) included in the mixed solvent may be 95:5 to 50:50 or 90:10 to 60:40. In a case in which the ratio of N,N-dimethylformamide (DMF) and dimethyl sulfoxide (DMSO) or the ratio of N,N-dimethylformamide (DMF) and γ-butyrolactone (GBL) satisfies the above range, uniformity in the diameters of the pores formed in the surface of the polysulfone layer may be increased, and thus, the polyamide layer may be uniformly formed and adhesive strength between the polysulfone layer and the polyamide layer may be improved to delay damage to the surface of the membrane even after a relatively long period of operations. Therefore, the method of manufacturing a reverse osmosis membrane according to the embodiment of the invention may allow for a reverse osmosis membrane to have superior durability and improved permeation flux while maintaining high salt rejection.

In the method of manufacturing a reverse osmosis membrane according to the embodiment of the invention, in a case in which the mixed solvent containing two or more solvents having different solubility parameter values is used at the time of forming the polysulfone layer, as described above, the number of micro pores formed in the polysulfone layer may be increased. In addition, the outflow rates of respective solvents included in the mixed solvent may be finely adjusted according to variations in the mixture ratio thereof, thereby further increasing the number of micro pores and significantly reducing the number of pores having a diameter of 40 nm or greater. Therefore, the plurality of micro pores may be easily formed and the pore diameter distribution, density, pore area ratio, and the like, thereof may be easily adjusted, in the case of manufacturing a reverse osmosis membrane by the method of manufacturing a reverse osmosis membrane according to the embodiment of the invention, as compared with a conventional method of manufacturing a reverse osmosis membrane including a polysulfone layer formed by only using DMF as a solvent. In addition, the reverse osmosis membrane manufactured by the above-described method has an effect of significantly improving the performance thereof such as salt rejection, permeation flux and the like, as compared with the conventional method.

Meanwhile, the forming of the polysulfone layer on the surface of the porous support may be performed by a method known in the art. The method of forming the polysulfone layer is not particularly limited. For example, the surface of the porous support may be coated with a solution obtained by dissolving a polysulfone polymer in a mixed solvent including two or more solvents having different solubility parameter values at a constant coating thickness and be then brought into contact with water to discharge the solvents therefrom, whereby a porous polysulfone support may be formed. Here, the contact process may be performed by dipping, coating, spraying or the like, and in particular, the dipping process may be appropriate.

Then, the forming of the active layer on the porous polysulfone support may be performed using a method known in the art, without limitation. For example, the active layer may be formed by dipping the porous support into an aqueous m-phenylenediamine (mPD) solution to form an mPD layer, and dipping the mPD layer into an organic solvent containing trimesoyl chloride (TMC) to allow the mPD layer to be brought into contact with the TMC so as to be interfacially polymerized. In addition, the active layer may be formed by spraying, coating or the like, instead of dipping.

Here, the active layer may be formed using an amine compound and an acyl halide compound through interfacial polymerization. Here, the amine compound may include, for example, m-phenylenediamine, p-phenylenediamine, 1,3,6-benzenetriamine, 4-chloro-1,3-phenylendiamine, 6-chloro-1,3-phenylendiamine, 3-chloro-1,4-phenylendiamine or mixtures thereof, but is not limited thereto. In addition, the acyl halide compound may include, for example, trimesoyl chloride, isophthaloyl chloride, terephthaloyl chloride, or mixtures thereof, but is not limited thereto.

After the active layer is formed on the porous polysulfone support as described above, drying and washing processes may be performed. Here, the drying process may be performed at 60° C. to 70° C. for five to ten minutes. In addition, the washing process is not particularly limited and may be, for example, performed using a basic aqueous solution. The basic aqueous solution is not particularly limited, and may be, for example, a sodium carbonate aqueous solution. The washing process may be performed at room temperature for two hours or longer.

Meanwhile, as shown in Tables 1 and 2 obtained through experimentation, the reverse osmosis membrane manufactured by the above-described method according to the embodiment of the invention was significantly improved in terms of salt rejection and permeation flux, as compared with existing reverse osmosis membranes.

In addition, as shown in Table 3 obtained through a further experiment, the reverse osmosis membrane manufactured by the above-described method according to the embodiment of the invention did not suffer from a significant degradation of a water purifying function even after two hours from injection of a fouling material, casein. That is, the reverse osmosis membrane according to the embodiment of the invention had equivalent or superior antifouling properties and durability as compared to those of existing reverse osmosis membranes.

Therefore, the reverse osmosis membrane according to the embodiment of the invention may achieve improved permeation flux while having superior supporting force, salt rejection, antifouling properties, and durability, as compared with existing reverse osmosis membranes, by adjusting the pore diameter distribution, density, pore area ratio, and the like, of pores formed in the polysulfone layer using a difference in the outflow rates of the solvents through the mixed solvent containing two or more solvents having different solubility parameter values in the forming of the polysulfone layer.

Meanwhile, since the reverse osmosis membrane according to the embodiment of the invention has significantly increased permeation flux while having superior salt rejection, the efficiency thereof is excellent. Therefore, the reverse osmosis membrane according to the embodiment of the invention may be advantageously used in the desalination of saltwater and seawater, the production of ultrapure water for semiconductor industrial use, the disposal of various types of industrial waste water, and the like.

Inventive Example 1

N,N-dimethylformamide (DMF) having a solubility parameter value of 24.9 $(J/cm^3)^{1/2}$ and dimethyl sulfoxide (DMSO) having a solubility parameter value of 26.7 $(J/cm^3)^{1/2}$ were mixed in a ratio of 90:10 to prepare a mixed solvent, and 18 wt % of polysulfone was added thereto and stirred at 80° C. for twelve hours or longer to prepare a uniformly combined liquid phase solution. The solution was cast on a non-woven polyester fabric having a thickness of 100 μm to obtain the resultant fabric having a thickness of 150 μm and the resultant fabric was dipped into water to manufacture a porous polysulfone support.

After dipping the manufactured porous polysulfone support into an aqueous solution containing 2 wt % of m-phenylenediamine (mPD) for two minutes and removing it therefrom, an excessive amount of the aqueous solution on the support was removed by using a 25 psi roller and dried at room temperature for 1 minute.

Then, the support was dipped into an ISOL-C solution (SKC Corp.) containing 0.1 wt % of trimesoyl chloride (TMC), then removed, and dried in an oven at 60° C. for ten minutes in order to remove an excessive amount of the organic solution therefrom. Thereafter, the support was washed in an aqueous solution containing 0.2 wt % of sodium carbonate at room temperature for two hours or longer, and then washed using distilled water. In this manner, a reverse osmosis membrane including a polyamide active layer having a thickness of 1 μm or less was manufactured.

Inventive Example 2

A reverse osmosis membrane was manufactured in the same manner as that of Inventive Example 1, except that DMF and DMSO were mixed in a ratio of 80:20.

Here, an image of the surface of the polysulfone layer analyzed by a scanning electron microscope (SEM) is shown in FIG. 1.

Inventive Example 3

A reverse osmosis membrane was manufactured in the same manner as that of Inventive Example 1, except that DMF and DMSO were mixed in a ratio of 70:30.

Inventive Example 4

A reverse osmosis membrane was manufactured in the same manner as that of Inventive Example 1, except that DMF and DMSO were mixed in a ratio of 60:40.

Inventive Example 5

A reverse osmosis membrane was manufactured in the same manner as that of Inventive Example 1, except that, instead of the mixed solvent of DMF and DMSO, N,N-dimethylformamide (DMF) having a solubility parameter value of 24.9 $(J/cm^3)^{1/2}$ and γ-butyrolactone (GBL) having a solubility parameter value of 25.6 $(J/cm^3)^{1/2}$ were mixed in a ratio of 90:10 to prepare a mixed solvent, and 16 wt % of polysulfone was added thereto.

Inventive Example 6

A reverse osmosis membrane was manufactured in the same manner as that of Inventive Example 1, except that DMF and GBL, instead of the mixed solvent of DMF and DMSO, were mixed in a ratio of 80:20 and 16 wt % of polysulfone was added thereto.

Figure 3:
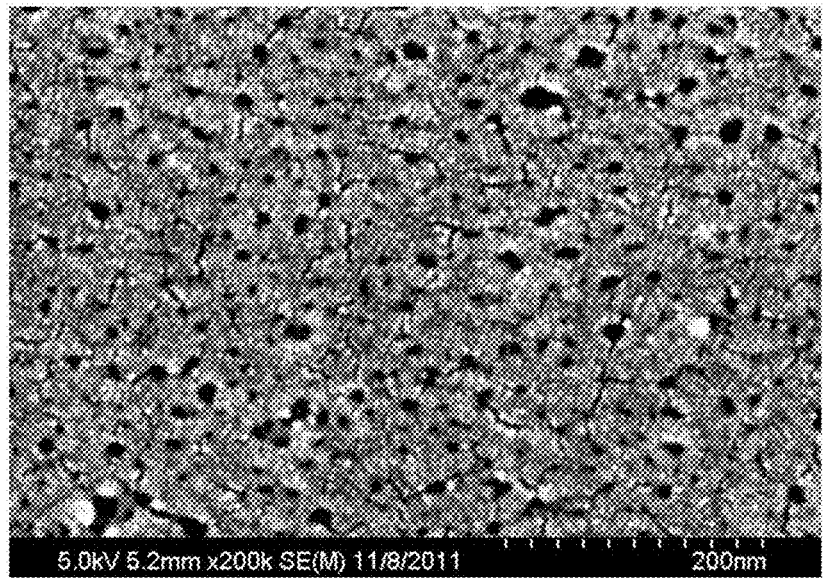
FIG. 3 is a scanning electron microscope (SEM) image showing a surface of a polysulfone layer of a reverse osmosis membrane manufactured according to Inventive Example 6.

Here, an image of the surface of the polysulfone layer analyzed by a scanning electron microscope (SEM) is shown in FIG. 3.

Inventive Example 7

A reverse osmosis membrane was manufactured in the same manner as that of Inventive Example 1, except that DMF and GBL, instead of the mixed solvent of DMF and DMSO, were mixed in a ratio of 70:30 and 16 wt % of polysulfone was added thereto.

Inventive Example 8

A reverse osmosis membrane was manufactured in the same manner as that of Inventive Example 1, except that DMF and GBL, instead of the mixed solvent of DMF and DMSO, were mixed in a ratio of 60:40 and 16 wt % of polysulfone was added thereto.

Comparative Example 1

A reverse osmosis membrane was manufactured in the same manner as that of Inventive Example 1, except that only DMF was used as a solvent in the forming of the porous polysulfone support.

Figure 2:
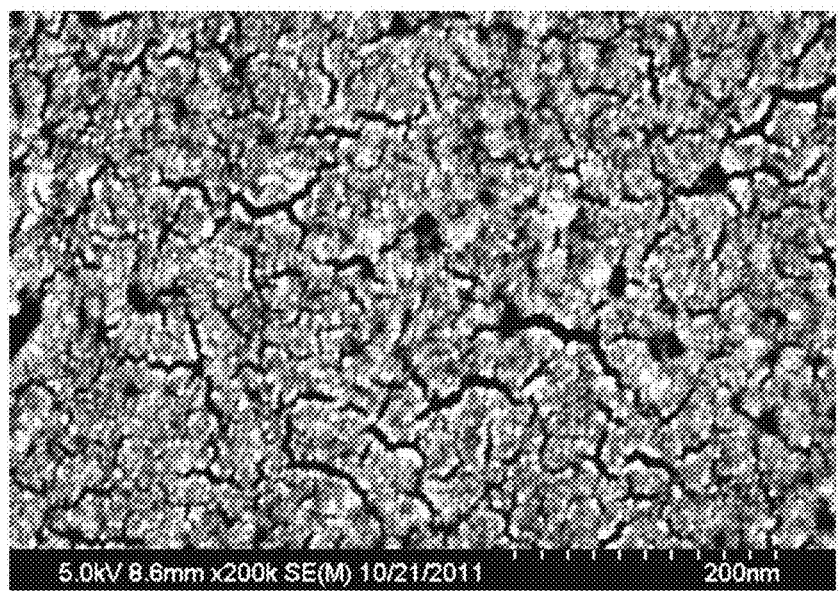
FIG. 2 is a scanning electron microscope (SEM) image showing a surface of a polysulfone layer of a reverse osmosis membrane manufactured according to Comparative Example 1.

Here, an image of the surface of the polysulfone layer analyzed by a scanning electron microscope (SEM) is shown in FIG. 2.

Comparative Example 2

A reverse osmosis membrane was manufactured in the same manner as that of Inventive Example 5, except that only DMF was used as a solvent in the forming of the porous polysulfone support.

Figure 4:
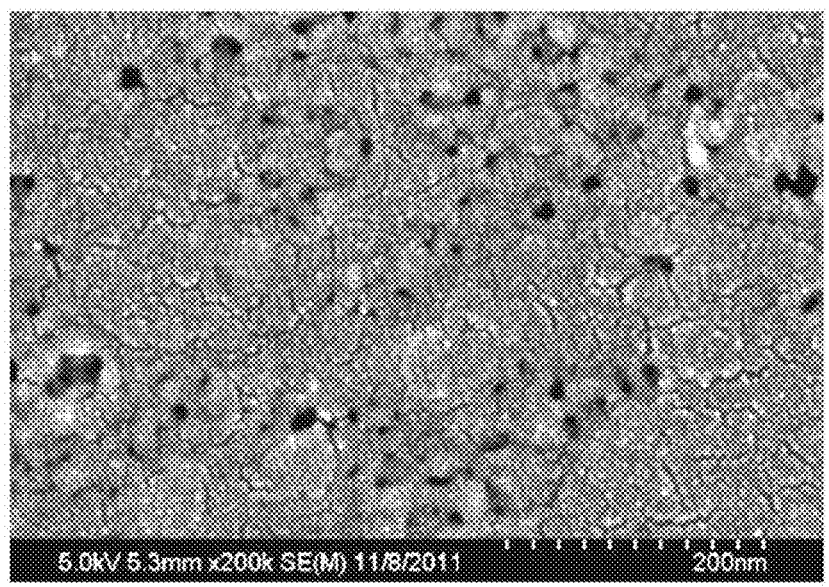
FIG. 4 is a scanning electron microscope (SEM) image showing a surface of a polysulfone layer of a reverse osmosis membrane manufactured according to Comparative Example 2.

Here, an image of the surface of the polysulfone layer analyzed by a scanning electron microscope (SEM) is shown in FIG. 4.

Experiment 1

Evaluation on Water Purifying Performance

The initial salt rejection and the initial permeation flux of the reverse osmosis membranes manufactured according to Inventive Examples 1 to 8 and Comparative Example 1 and 2 were measured. The initial salt rejection and the initial permeation flux were measured while supplying an aqueous sodium chloride solution of 32,000 ppm at a flow rate of 4,500 mL/min under 25° C. and 800 psi. An apparatus for evaluating the reverse osmosis membranes was a Sepa CF II cell (manufactured by GE Osmonics) including a flat type transmission cell, a high pressure pump, a storage bath and a cooler. The structure of the flat type transmission cell was a cross-flow type, and had an effective transmission area of 140 cm². After installing the washed reverse osmosis membrane on the transmission cell, a preliminary operation was sufficiently conducted for about 1 hour by using thirdly distilled water to stabilize the evaluation apparatus. Then, the thirdly distilled water was replaced with the aqueous sodium chloride solution of 32,000 ppm, and the operation of the evaluation apparatus was conducted for about 1 hour until the pressure and the permeation flux reached a normal state. Then, the amount of water transmitted for eight to ten minutes was measured, and the flux was calculated. The salt rejection was calculated by analyzing the concentration of salt before and after the transmission of water by using a conductivity meter. The measured results are shown in following Tables 1 and 2.

TABLE 1

|  | Rejection (%) | Flux (GFD) |
|---|---|---|
| Inventive Example 1 | 97.1 | 32.5 |
| Inventive Example 2 | 98.1 | 33.1 |
| Inventive Example 3 | 98.1 | 30.9 |
| Inventive Example 4 | 97.6 | 30.5 |
| Comparative Example 1 | 96.8 | 26.9 |

TABLE 2

|  | Rejection (%) | Flux (GFD) |
|---|---|---|
| Inventive Example 5 | 97.3 | 40.4 |
| Inventive Example 6 | 98.0 | 47.3 |
| Inventive Example 7 | 98.4 | 42.1 |
| Inventive Example 8 | 98.1 | 37.9 |
| Comparative Example 2 | 97.1 | 33.2 |

Experiment 2

Evaluation on Antifouling Properties

The antifouling properties of the reverse osmosis membranes manufactured according to Inventive Examples 1 to 8 and Comparative Examples 1 and 2 were evaluated. The evaluation of the antifouling properties was conducted by using a mixture solution of an aqueous NaCl solution of 32,000 ppm and an aqueous casein solution of 100 ppm under a pressure of 800 psi. After evaluating the initial salt rejection and the initial permeation flux, the aqueous casein solution of 100 ppm was injected into an evaluation tank, and changes in salt rejection and flux were immediately measured. After two hours, changes in salt rejection and flux were measured. The casein was used after dissolving in an aqueous solution with a pH of 11 or greater. The measured results are shown in Table 3.

TABLE 3

|  | Salt Rejection Immediately After Injection of Casein | Initial Flux Immediately After Injection of Casein | Salt Rejection After 2 Hours from Injection of Casein | Initial Flux After 2 Hours from Injection of Casein |
|---|---|---|---|---|
| Inventive Example 1 | 97.1 | 32.5 | 97.3 | 31.2 |
| Inventive Example 2 | 98.1 | 33.1 | 98.2 | 30.4 |

TABLE 3-continued

|  | Salt Rejection Immediately After Injection of Casein | Initial Flux Immediately After Injection of Casein | Salt Rejection After 2 Hours from Injection of Casein | Initial Flux After 2 Hours from Injection of Casein |
|---|---|---|---|---|
| Inventive Example 3 | 98.1 | 30.9 | 98.5 | 30.7 |
| Inventive Example 4 | 97.6 | 30.5 | 98.6 | 31.6 |
| Inventive Example 5 | 97.3 | 40.4 | 98.8 | 34.9 |
| Inventive Example 6 | 98.0 | 47.3 | 98.4 | 39.8 |
| Inventive Example 7 | 98.4 | 42.1 | 99.1 | 38.4 |
| Inventive Example 8 | 98.1 | 37.9 | 98.7 | 35.6 |
| Comparative Example 1 | 96.8 | 26.9 | 96.9 | 21.3 |
| Comparative Example 2 | 97.1 | 33.2 | 97.3 | 24.6 |

Experiment 3

Measurement of Pore Diameter Distribution

The pore diameter distribution was measured in the surfaces of the respective polysulfone layers of the reverse osmosis membranes manufactured according to Inventive Examples 1 to 8 and Comparative Examples 1 and 2. Here, the pore diameter distribution was measured based on an area of 1.27 μm×0.83 μm in the surface of the polysulfone layer. In addition, the measurement of the pore diameter distribution was performed using a count/size function of an image-Pro Plus with respect to an SEM image of the surface of the polysulfone layer compensated in a manner in which the contrast value of the SEM image was compensated as 80. The measured results are illustrated in Table 4.

Figure 5:
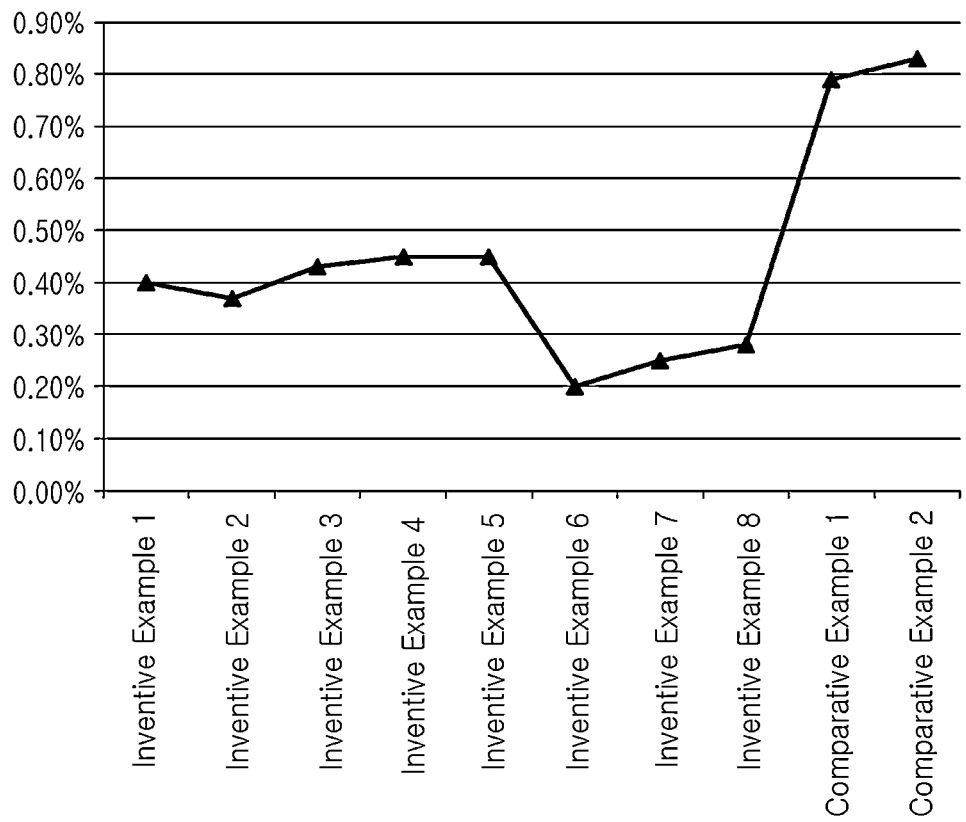
FIG. 5 is a graph showing a ratio of pores having a diameter of 40 nm or greater to the total pores formed in a surface of a polysulfone layer of a reverse osmosis membrane, respectively manufactured according to Inventive Examples 1 to 8 and Comparative Examples 1 and 2.

With reference to Table 4 and FIG. 5, the reverse osmosis membranes manufactured according to Inventive Examples 1 to 8 showed a significant reduction in the formation of pores having a diameter of 40 nm or greater in the surface of the polysulfone layer, as compared with those manufactured according to Comparative Examples 1 and 2.

TABLE 4

|  | Total Number of Pores | Number of Pores Having Diameter of 40 nm or greater | Ratio of Pores Having Diameter of 40 nm or greater to Total Pores |
|---|---|---|---|
| Inventive Example 1 | 12907 | 52 | 0.40% |
| Inventive Example 2 | 12892 | 48 | 0.37% |
| Inventive Example 3 | 12794 | 55 | 0.43% |
| Inventive Example 4 | 12705 | 57 | 0.45% |
| Inventive Example 5 | 12903 | 58 | 0.45% |
| Inventive Example 6 | 12805 | 26 | 0.20% |
| Inventive Example 7 | 12726 | 32 | 0.25% |
| Inventive Example 8 | 12500 | 35 | 0.28% |
| Comparative Example 1 | 12998 | 103 | 0.79% |
| Comparative Example 2 | 13089 | 109 | 0.83% |

As set forth above, in a method of manufacturing a reverse osmosis membrane according to embodiments of the inventive concept, a polysulfone layer is formed on a porous support using a mixed solvent containing two or more solvents having different solubility parameter values to thereby adjust the pore diameter distribution, density, pore area ratio, and the like, of pores using a difference in the outflow rates of the solvents when the pores are formed in the polysulfone layer. Therefore, the manufactured reverse osmosis membrane may achieve improved permeation flux while having superior salt rejection, antifouling properties, and durability, as compared with existing reverse osmosis membranes.

While the present inventive concept has been shown and described in connection with the embodiments, it will be apparent to those skilled in the art that modifications and variations can be made without departing from the spirit and scope of the inventive concept as defined by the appended claims.

What is claimed is:

1. A method of manufacturing a reverse osmosis membrane, the method comprising:
   forming a polysulfone layer with a plurality of pores by applying a solution including a polymer having a sulfonic acid group and a mixed solvent containing first and second solvents having different solubility parameter values to a surface of a porous support; and
   forming a polyamide active layer on the polysulfone layer,
   wherein the first solvent is N,N-dimethylformamide (DMF), and the second solvent is γ-butyrolactone (GBL), the first solvent and the second solvent being mixed in a ratio of 80:20 to 60:40, and
   wherein a percentage of the plurality of pores having a diameter of 40 nm or greater in the surface of the polysulfone layer is from 0.20 to 0.28%.

2. The method of claim 1, wherein the solution comprises:
   the polymer having a sulfonic acid group in an amount of 5 to 45 parts by weight, based on 100 parts by weight of the solution; and
   the first and second solvents in an amount of 55 to 95 parts by weight, based on 100 parts by weight of the solution.

* * * * *